July 31, 1962 J. F. ZALESKI 3,047,859
CRYSTAL MIXER PROTECTION CIRCUIT
Filed Sept. 28, 1959
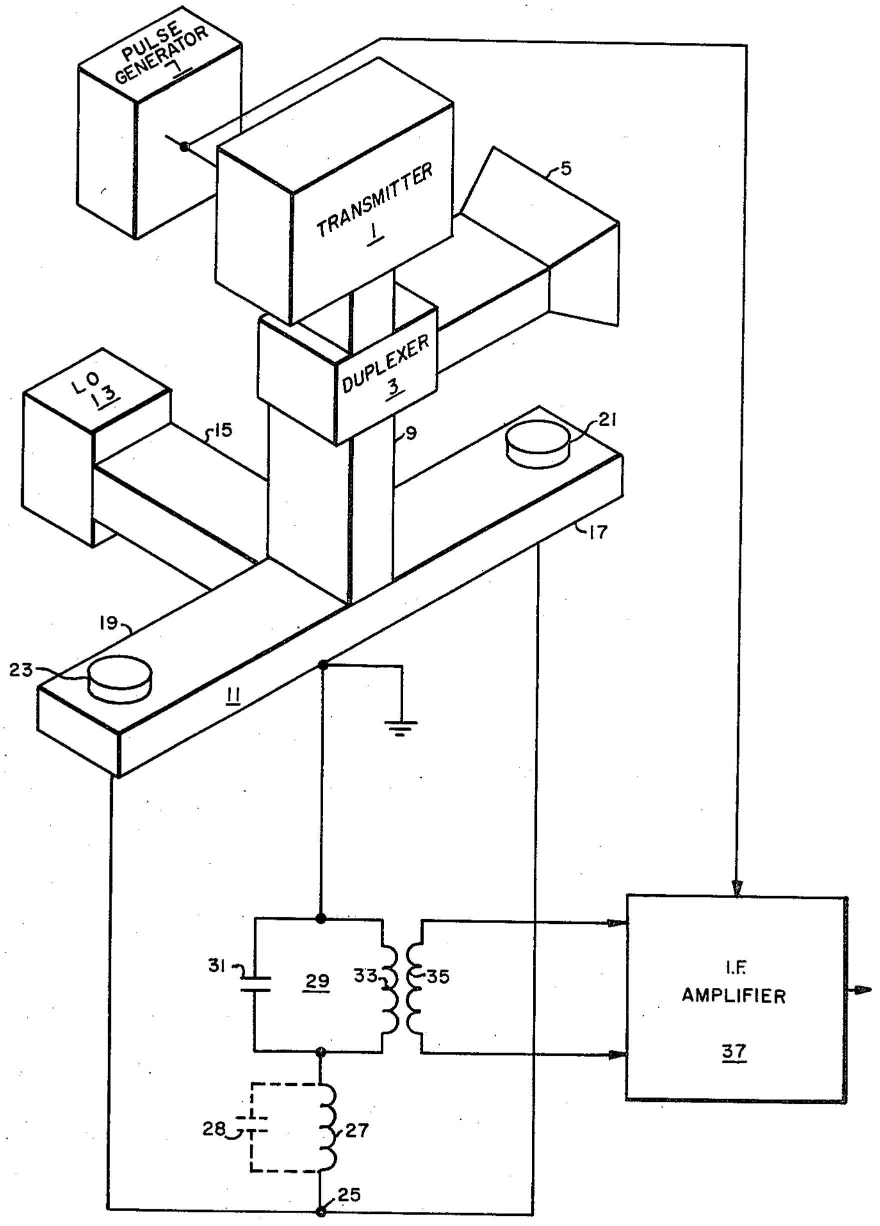
INVENTOR.
JOHN F. ZALESKI
BY H. A. Mackey
ATTORNEY United States Patent Office 3,047,859

Patented July 31, 1962

3,047,859

CRYSTAL MIXER PROTECTION CIRCUIT

John F. Zaleski, Pleasantville, N.Y., assignor to General Precision Inc., a corporation of Delaware Filed Sept. 28, 1959, Ser. No. 842,974
9 Claims. (Cl. 343—8)

This invention relates to crystal mixer protection circuits and more particularly to circuits which may be utilized for preventing damage to or the destruction of crystal diode mixers used in radar devices such as the well known Doppler ground speed and drift measuring equipment commonly employed in aircraft navigation.

In pulsed radar systems which use a single antenna system to both radiate and detect the return or echo radar signal serious problems are encountered due to leakage of the high power transmitter energy into the receiver. These systems usually employ duplexers in an attempt to isolate the receiver from the transmitter and for connecting the transmitter to the antenna and the antenna to the receiver.

If no corrective action is taken, leakage currents through the duplexer will cause a current through the crystal diode mixer in the receiver which will, in the case of high power transmitters, exceed the burnout current of the diode. Thus, it is necessary to eliminate or otherwise reduce the current through the diode. An obvious solution is to improve the design of the duplexers so as to reduce the amount of leakage current applied to the diode during transmission. However, this solution is not easily attained. Duplexers which will so limit the current are available but achieve this end at a sacrifice in speed of operation which in certain instances can not be tolerated. Furthermore, such devices will not protect the mixer from currents caused by other powerful nearby transmitters during period when the system transmitter is inoperative or not transmitting. For example, when the high intensity energy from a nearby transmitter is picked up by the antenna system and fed directly through the duplexer to the receiver.

One such duplexing system employs circuit networks which contain ionizing gas switches to perform the duplexing function. These ionizing gas switches unfortunately have a finite decay time which introduces a blanking signal into the receiver for a portion of the receiving interval which prevents the reception of signals from nearby targets.

Another system utilizes a ferrite switch in the duplexing scheme which prohibits the transmitted power from reaching the receiver diode. However, the extent of this power limiting is usually not in excess of 30 decibels. This circuit does not have the operational degrading characteristics of the gas diode duplexer relative to ringing into the receiving portion of the pulsing cycle but the receiver diode protection is not as effective and in certain applications it is by itself inadequate.

One object of the invention is to provide a crystal mixer protection circuit which is reliable in operation and which protects the crystal against burnout current levels at all times.

Another object of the invention is to provide a crystal mixer protection circuit which is easily manufactured.

The invention contemplates a crystal mixer protection circuit comprising; a hybrid junction having one arm for connecting the junction to a source of pulsed electromagnetic energy having a varying intensity, a second arm for connecting the junction to a local oscillator which supplies electromagnetic energy having a frequency differing from that of the source by a predetermined amount and an intensity substantially lower than the highest intensity supplied by the source, and a pair of collinear arms each containing a crystal diode mixer, similar elements of which are connected to ground and to a common junction, respectively; and circuit means connected between said common junction and ground for presenting an infinite impedance to pulsating currents having a frequency equal to the frequency at which the source of electromagnetic energy is pulsed.

The foregoing and other objects and advantages of the invention will appear more clearly from a consideration of the specification and drawing wherein one embodiment of the invention has been described and shown in detail for illustration purposes only.

In the drawing a transmitter 1 supplies microwave energy to a duplexer 3 which is connected to an antenna 5. Transmitter 1 is pulsed by an asymmetric pulse generator 7.

Antenna 5 radiates the transmitter energy toward the ground during the relatively short transmission period of pulse generator 7 and receives the Doppler frequency shifted back scattered or echo energy during the relatively long "off" period of pulse generator 7.

The back scattered energy received by antenna 5 is passed through duplexer 3 which switches it to the series input arm 9 of a hybrid junction or "magic tee" 11. A heel oscillator 13 supplies energy, at a frequency somewhat higher than the transmitter, to junction 11 via a shunt or parallel arm 15. Two collinear arms 17 and 19 form part of junction 11 and the energy from both arms 9 and 15 divides equally therebetween when the arms are terminated in their characteristic impedances.

The energy components in collinear arms 17 and 19 fed from series arm 9 are out of phase with each other and the energy components fed from arm 15 are in phase in both of the collinear arms. Two matched and balanced diode detectors 21 and 23 are connected in arms 17 and 19, respectively. The diodes are poled in the same direction and each has a similar electrode connected to a common junction 25. A choke coil 27, shunted by its distributed capacitance 28 shown in dashed line and designed to block oscillations having a frequency equal to to the frequency of pulse generator 7, and a resonant tank circuit 29, comprising a parallel connected condenser 31 and an inductive winding 33, are connected in series between junction 25 and the outer shell of arms 17 and 19 which is at ground potential. Tank circuit 29 is tuned to resonance at a frequency substantially equal to the difference between the frequency of local oscillator 13 and the Doppler shifted transmitter frequency. For practical purposes it may be tuned to resonate at the difference between the local oscillator frequency and the transmitter frequency since the frequency shift due to the Doppler effect is comparatively small and well within the frequency limits of tank circuit 29.

Tank circuit 29 is inductively coupled by a winding 35 to an intermediate frequency amplifier 37, which is designed to amplify a narrow band of frequencies centered at a frequency substantially equal to the difference between the local oscillator frequency and the transmitter frequency. The asymmetric pulse generator 7 supplies pulses during the short transmission period for blanking amplifier 37 to prevent amplification of any energy which might be present in tank circuit 29 during the transmission period.

Diodes 21 and 23 are protected from damage from leakage current through duplexer 3 during transmission since choke 27 presents a high impedance to the modulated transmitter pulse and the direct current outputs of diodes 21 and 23 buck each other out at junction 25.

During periods of transmitter quiescence the echo signal $f_r$ which equals $f_t(\pm)\Delta F$, depending on the direction of the beam relative to the direction of the craft which mounts the antenna, is modulated by the local oscillator frequency $f_t+f_a$, wherein $f_a$ may be about 30 mc. to produce a pulsating direct current in tank circuit 29 having a frequency equal to $f_a(\pm)\Delta F$. This is transformed by inductively coupled winding 35 and applied to intermediate frequency amplifier 37 and processed thereafter in usual manner.

During transmission the leakage energy $f_t$ is also modulated by the local oscillator frequency $f_t+f_a$ to provide pulsating direct current in tank circuit 29 having a frequency equal to $f_a$. Therefore it is necessary to blank the intermediate frequency amplifier during periods of transmission to prevent signals from being amplified and going to the frequency tracker which is not shown.

The direct current through diodes 21 and 23 due to the pulsating direct current during transmission is well below the burnout level of the diodes since the magnitude of the $f_a$ component is limtied by the output level of the local oscillator.

In an alternative embodiment pulse generator 7 may be so connected as to turn local oscillator 13 "off" when transmitter 1 is turned "on" and turn local oscillator 13 "on" when transmitter 1 is turned "off." With this configuration it is no longer necessary to blank amplifier 37 since no component at or near $f_a$ will be present in tank circuit 29 during transmission.

In one specific embodiment pulse generator 7 was set at 50 kc., transmitter 1 at 9000 mc. with a 1 kw. peak pulse power and a 50 kc. repetition rate set by pulse generator 7, and local oscillator 13 at 9030 mc.

While only one embodiment of the invention has been shown and described in detail for illustration purposes it is to be expressly understood that the invention is not to be limited thereto.

What is claimed is:

1. A crystal mixer protection circuit comprising; a hybrid junction having one arm for connecting said junction to a source of pulsed electromagnetic energy having a varying intensity, a second arm for connecting said junction to a local oscillator for supplying electromagnetic energy having a frequency which differs from the frequency of the source by a predetermined amount and an intensity substantially lower than the highest intensity supplied by the source, and a pair of collinear arms each containing a crystal diode mixer similar elements of which are connected to ground and to a common junction, respectively; and circuit means connected between said common junction and ground for presenting an infinite impedance to pulsating currents having a frequency equal to the pulse frequency of the electromagnetic energy from the source.

2. A crystal mixer protection circuit comprising, a hybrid junction having a series and a shunt arm, one of said arms providing a connection for said junction to two sources which alternately supply electromagnetic energy of substantially the same frequency but of different intensities, the other of said arms providing a connection for said junction to a local oscillator having a frequency which differs by a predetermined amount from the frequency of one of the said sources, a pair of collinear arms extending from the junction each containing one crystal diode mixer similar elements of which are connected to ground and to a common junction, respectively, and circuit means connected between said junction and ground for offering an infinite impedance between the junction and ground to pulsating currents having a frequency equal to the alternating frequency at which the two sources of electromagnetic energy are supplied to the hybrid junction.

3. A crystal mixer protection circuit as set forth in claim 2 in which said circuit means includes a choke coil having an inductance and a distributed capacitance such that it presents an infinite impedance to pulsating currents having a frequency equal to the alternating frequency at which the two sources of electromagnetic energy are supplied to the hybrid junction.

4. A crystal mixer protection circuit as set forth in claim 3 which includes as a part of the circuit means a tank circuit, having a resonant frequency equal to the difference in frequency between the local oscillator frequency and the frequency of the electromagnetic energy from the two sources, in series with the said choke coil.

5. A crystal mixer protection circuit comprising; a hybrid junction having one arm for connecting said junction to a source of pulsed electromagnetic energy having a varying intensity, a second arm for connecting said junction to a local oscillator for supplying electromagnetic energy having a frequency which differs from the source frequency by a predetermined amount and an intensity substantially lower than the highest intensity supplied by the source, and a pair of collinear arms each containing a crystal diode mixer similar elements of which are connected to ground and to a common junction, respectively; and a series connected choke coil and tank circuit between said junction and ground, said tank circuit being tuned to resonate at a frequency substantially equal to the difference in frequency between the local oscillator frequency and the frequency of the source of electromagnetic energy, said choke coil having an inductance and distributed capacitance such that it presents an infinite impedance to pulsating currents having a frequency equal to the pulsating frequency of the electromagnetic energy of varying intensity.

6. A crystal mixer protection circuit comprising; a hybrid junction having a series arm for connecting the junction to a source of pulsed electromagnetic energy having a varying intensity and frequencies falling within a narrow band, a parallel arm for connecting said junction to a local oscillator for supplying electromagnetic energy having a frequency which differs from the central frequency of the said band by a predetermined amount and an intensity substantially lower than the highest intensity supplied by the source, and a pair of collinear arms each containing a crystal diode mixer similar elements of which are connected to ground and to a common junction, respectively; and a series connected choke coil and tank circuit between said junction and ground, said tank circuit being tuned to resonate at a frequency substantially equal to the difference in frequency between the local oscillator frequency and the central frequency of the said band of frequencies, said choke coil having an inductive and distributed capacitance such that it presents an infinite impedance to pulsating currents having a frequency equal to the pulsing frequency of the electromagnetic energy of varying intensity.

7. A crystal mixer protection circuit suitable for use in Doppler radar navigation systems comprising, a pulsed transmitter, a duplexer for applying the transmitter output to an antenna system for radiating the energy toward the ground and receiving the Doppler frequency shifted energy which is back scattered toward the said antenna system and for applying the Doppler frequency shifted energy to a first arm of a hybrid junction, a local oscillator for supplying an output having a frequency differing from the frequency of the transmitter output by a predetermined amount and having an intensity substantially lower than the intensity of the transmitter energy which leaks past the duplexer and is applied to the hybrid junction during the transmitting period, said local oscillator output being applied to the said hybrid junction by a second arm, a pair of collinear arms extending from said hybrid junction each of which contains a crystal diode mixer similar elements of which are connected to ground and to a common junction, respectively, and circuit means connected between said common junction and ground for presenting an infinite impedance to pulsating currents having a frequency equal to the pulsing frequency of the transmitter.

8. A crystal mixer protection circuit as defined in claim 7 in which said circuit means includes a choke coil having an inductance and a distributed capacitance such that it presents an infinite impedance to the said pulsating currents.

9. A crystal mixer protection circuit as set forth in claim 8 which includes as a part of the circuit means a tank circuit in series with the said choke coil and having a resonant frequency equal to the difference in frequency between the local oscillator output frequency and the transmitted output frequency.

References Cited in the file of this patent

UNITED STATES PATENTS 2,468,166 Bruck ---------------- Apr. 26, 1949